P. P. & E. A. King,
Sawing Machine.

No. 113,531. Patented Apr. 11, 1871.

Witnesses:
William W. Herthel
Robert Burns

Inventors:
Phineas P. King
Edwin A. King

United States Patent Office.

PHINEAS F. KING AND EDWIN A. KING, OF ST. LOUIS, MISSOURI.

Letters Patent No. 113,531, dated April 11, 1871.

IMPROVEMENT IN SAWING-MACHINES.

The Schedule referred to in these Letters Patent and making part of the same.

*To all whom it may concern:*

Be it known that we, PHINEAS F. KING and EDWIN A. KING, of St. Louis, in the county of St. Louis and State of Missouri, have made certain new and useful Improvements in Machines for Sawing Straight, Angular, and similar irregular Work; and we do hereby declare that the following is a full and true description thereof, reference being had to the accompanying drawing and to the letters of reference marked thereon.

This invention relates—

First, to such a construction of the broad slide that the same, in combination with an adjustable gauge, shall be adapted for all manner of straight as well as acute angular ripping purposes;

Secondly, to the arrangement of additional slides, in combination with a gauge and saw-table, for accomplishing all kinds of mitering, beveling, and rabbeting purposes;

Thirdly, to the arrangement of parts for regulating the stop motion of the slides; and Lastly, to the arrangement of a protractor for facilitating angular work, and to certain detail construction of parts, all of which will hereinafter more fully appear.

To enable those herein skilled to make and use our said invention, we will now more fully describe the same, referring to the accompanying—

Figure 1:
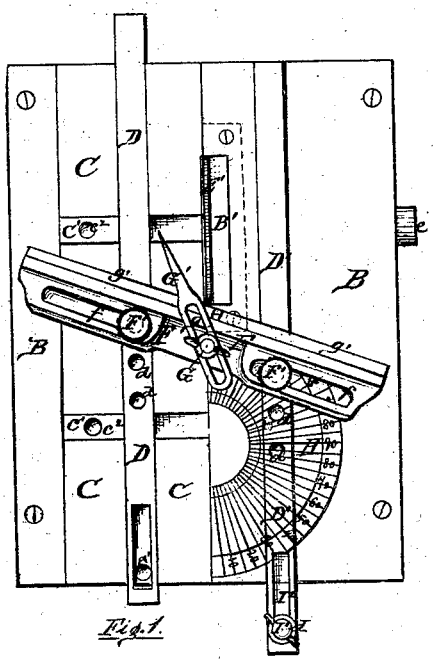
Figure 2:
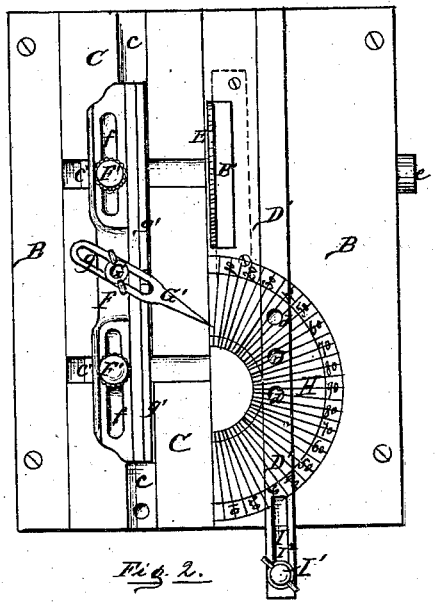
Figure 3:
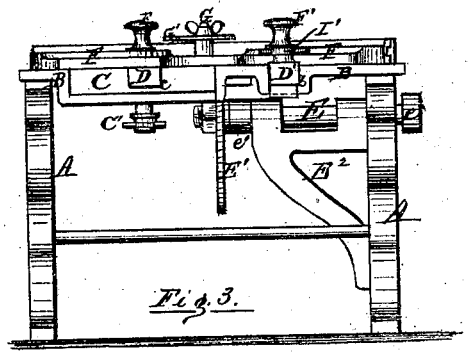
Figure 4:
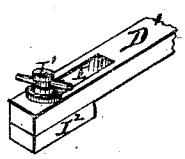

Figures 1 and 2, respectively, as top plans; to
Figure 3 as an end view; and to
Figure 4 as a perspective view of detail parts for regulating the stop motion.

Upon a suitable metal frame, A, is secured the table B in any proper manner.

In said table B (formed either of wood or metal) the broad slide C is fitted to slide.

The slide C has also a slide-rest, $c$, similar to the opposite rest $b$, fitted in the table B.

In said slide-rests $c$ and $b$ the parallel slides D and D' are fitted to slide, as shown in figs. 1 and 2.

The saw-mandrel E, carrying the saw $E^1$ and driving-pulley $e$, we support in a suitable arbor, $E^2$, secured firmly within the side of the frame A. Proper belting, passing around the pulley $e$, operates the saw $E^1$ in manner usual.

In order, however, that additional saws and cutter-heads may be secured to the mandrel E, the table B is suitably slotted at B', as shown in figs. 1 and 2.

Suitable collars, $e$, secure the saws in proper position on the mandrel E.

In combination with the slides C, D, and D', we arrange the gauge F, made adjustable by corresponding slots, $f$, in which milled set-screws, F' are fitted. Said gauge has also a thumb-screw, G, carrying a self-marker, G', made adjustable by its slots $g$.

The front edge of said gauge F we provided with adjustable face-block, $g'$, in manner usual, to allow the saw to cut entirely through the stuff.

For ripping, splitting, straight-sawing work, and the like, the broad slide C is used, the narrow slide D being dispensed with.

In order to gauge the cut with reference to the saw $E^1$, the broad slide C has also small slides, $c^1$, fitted to slide in proper transverse grooves, as shown in figs. 1 and 2.

The gauge F being, therefore, properly secured to the small slides $c^1$, as shown in fig. 2, (said slides for this purpose having holes, $c^2$, in which the screws F' engage,) the operator is readily enabled to rip or saw all manner of straight work, and to feed the material (by adjusting the guide or gauge accordingly) so as to saw thick or thin, as desired; also, it is plain that, as the gauge F is rendered adjustable by its slots $f$, the operator is furthermore enabled to adjust said gauge in angled position, to guide the stuff to be sawed for acute or angular work.

To accomplish all kinds of beveling, mitering, jointing, rabbeting, and other similar irregular saw-work, the parallel slides D D' are used in combination with the gauge F, as shown in fig. 1, the broad slides C being secured stationary to the table B by proper end set-screw C'.

To adjust and secure the gauge F in the various required angular positions on the slides D D', the same are provided, respectively, with a series of holes, $d$, (in which the screws F' of said gauge are fitted,) and by means whereof said gauge is also secured in close or distant positions from the saw $E^1$.

Furthermore, to facilitate all kinds of mitering and other angular work with accuracy, we have provided the table B with an ordinary protractor, H, numbered in both directions at right angles with the saw $E^1$, in manner indicated in figs. 1 and 2.

By such an arrangement of parts the operator is readily enabled to adjust and secure the gauge F' to guide the stuff to be sawed at any angle indicated by the protractor H. It will also be observed, by the arrangement of parts, that the self-marker G' can at the same time be adjusted to any point from the saw as the case requires, for sawing equal distances, or for accomplishing long and short cuts.

To regulate the stop motion of the parallel slides D D' said slides, at their rear ends, have slots, I, respectively, in which a set-screw, $I^1$, carrying a stop-block, $I^2$, is arranged adjustable, as clearly shown in detail in fig. 4.

By simply adjusting the stop-block I² in position, (on either of the slides D D',) the movements of said slides and gauge F can be regulated within various positions from the saw, and thus the material can be sawed or cut to accurate distances.

Our improved machine in its operation accomplishes all kinds of cutting, ripping, jointing, beveling, rabbeting, mitering, and similar irregular work with the greatest precision and accuracy, saving time ordinarily consumed in measuring, planning, laying out, and otherwise in its use is cheap and durable.

Having thus fully described our said invention,

What we claim, and desire to secure by Letters Patent, is—

1. The arrangement of the parallel slides D D' with adjustable stop-block I², for regulating the stop motion of said slides, in combination with the gauge F, substantially as set forth.

2. The gauge F, small slides $c^1$, when combined with the broad slide C, table B, arbor and saw attachments E E¹, frame A, and arranged to operate substantially as and for the purpose set forth.

3. The parallel slides D D', having slots I, stop motion-regulating devices I¹ I², gauge F, protractor H, when arranged in combination with the broad slide C, table B, saw E¹, arbor E, and frame A, to operate for sawing angular and irregular work, as described.

In testimony of said invention we have hereunto set our hands in presence of witnesses.

PHINEAS F. KING.
EDWIN A. KING.

Witnesses:
WILLIAM W. HERTHEL,
ROBERT BURNS.